L. H. WESTCOTT.
STRAINER FOR TOBACCO PIPES.
APPLICATION FILED NOV. 9, 1910.
1,004,322.
Patented Sept. 26, 1911.
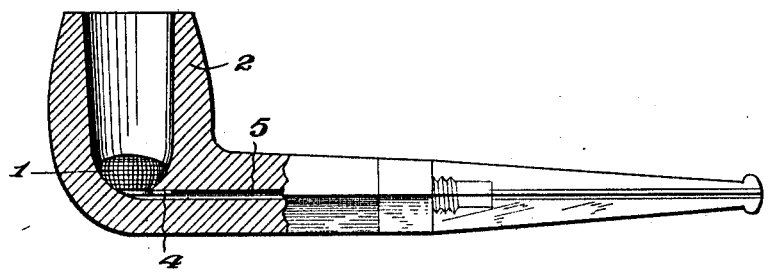
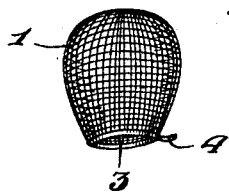
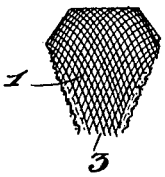
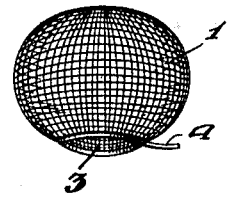
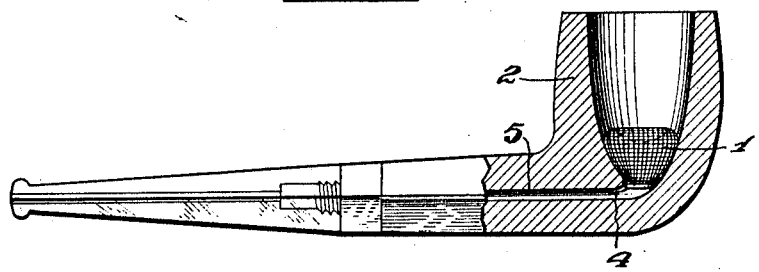
WITNESSES
INVENTOR

UNITED STATES PATENT OFFICE.

LEE H. WESTCOTT, OF PITTSBURG, PENNSYLVANIA.

STRAINER FOR TOBACCO-PIPES.

1,004,322.  Specification of Letters Patent.  Patented Sept. 26, 1911.

Application filed November 9, 1910. Serial No. 591,492.

*To all whom it may concern:*

Be it known that I, LEE H. WESTCOTT, a resident of Pittsburg, in the county of Allegheny and State of Pennsylvania, have invented a new and useful Improvement in Strainers for Tobacco-Pipes, of which the following is a specification.

This invention relates to strainers for tobacco pipes.

The object of the invention is to provide a very simple device for the purpose specified, which can be manufactured at a very low cost, and which can be readily applied to pipe bowls of various sizes and shapes.

Generally stated the invention comprises a hollow foraminous body adapted to enter the bowl and being so constructed that it yields when pressed to slightly flatten and engage the walls of the bowl and be thereby held against accidental displacement.

In the accompanying drawing Figure 1 is a sectional view through a pipe bowl showing the strainer in place; Fig. 2 is a side view of one form of strainer before its application to the pipe, the same being shown larger than full size; Figs. 3 and 4 are side elevations of other forms of the strainer; and Fig. 5 shows the application of the strainer to a bowl of different shape from that shown in Fig. 1.

My improved screen is shown at 1, and is preferably formed from wire cloth or other material which can be readily shaped and which will yield when pressure is applied to the hollow body. The strainer is in the form of a hollow body which may be of various shapes, either an inverted cup, a sphere as shown in Fig. 4, or of elliptical or other shape, but which preferably is elongated in vertical direction and tapering downward so that it will readily enter the pipe bowl 2, and will not turn or tilt when being pressed down therein. Fig. 2 shows it as somewhat pear or balloon shape, having a bulbous upper portion and tapering toward its lower end, while Fig. 3 shows it as an inverted truncated cone, having a flat top and tapering downwardly. The bottom of the strainer is preferably open as shown at 3, which opening may be of considerable size, or materially contracted. This lower end may be finished if desired, such as by running a wire therethrough, the end 4 of which can be allowed to project so that it will enter the hole or air passage 5 in the pipe stem and assist in holding the strainer in place.

Fig. 4 shows the strainer of spherical form opened at the bottom as above described. The pear or elongated shape of tapering form shown in Figs. 2 and 3 is however preferred as it more readily adapts itself to bowls of various sizes and shapes, as will be readily apparent, as well as being more easily inserted, as above stated.

The screen described is placed in the bottom of the bowl of the pipe, being merely slipped down into the bowl and then pressed with a blunt instrument or the finger to cause the same to somewhat flatten and expand laterally until it comes into sufficiently firm contact with the walls of the bowl to hold it against accidental displacement. The final shape of the strainer depends upon the size and shape of the bowl. With a bowl of large diameter the hollow body is necessarily flattened to a greater extent than with a bowl of less diameter. The upper wall of this hollow body when forced into final position may be convex, or substantially flat, or even slightly concave, as shown in Fig. 5. The body however must not be collapsed to such an extent that the hollow or open space 6 below the top wall thereof is destroyed. The formation of the hollow body from wire cloth permits the same to yield readily under pressure and expand in the manner above described. Hence it can be applied to any shape or size of pipe bowl. The opening in the bottom is not absolutely necessary, but is preferred, as it not only permits a free communication from the hollow space within the screen with the air passage in the steam, but also makes it easier to manufacture the article as it is not necessary to contract the wire cloth to the same extent as would be necessary if the hollow body were entirely closed. As a matter of fact the opening in the bottom can be left very large so that the body will be substantially of inverted cup shape, but slightly contracted at the bottom.

The screen when put in place absolutely prevents the entrance of all fine particles of tobacco into the mouth of the smoker, prevents the stem from clogging and the consequent liability of saliva saturated tobacco and the like being drawn into the mouth. The hollow space below the screen also prevents the saliva from saturating the tobacco and hence avoids the strong rank taste usually experienced near the end of the smoke. The screen has a large surface upon which the tobacco is supported, so that there is no obstruction to the draw of the pipe, but on the contrary the pipe draws very easily and uniformly over the entire cross sectional area of the bowl. The large exposed surface distributes the draft so that clogging of the screen does not occur. The pipe can be filled, emptied, and cleaned in the usual way without disturbing the strainer. At the same time the screen can be very easily removed when desired, again replaced or renewed. It can be pressed into place easily with the end of a finger, or with a blunt instrument, such as the blunt end of a pencil.

It will be understood that various modifications in the shape of the hollow strainer body can be made without departing from the spirit of the invention.

What I claim is:

1. A strainer for tobacco pipes comprising a hollow body having foraminous walls of single thickness and being open at its bottom and adapted to enter the pipe bowl, and being so constructed that when pressed it yields and flattens somewhat to frictionally engage the walls of the bowl.

2. A strainer for tobacco pipes comprising a hollow body having foraminous walls of single thickness and being of decreasing size toward its bottom and open at its bottom and adapted to enter the pipe bowl and being so constructed that when pressed it yields and flattens somewhat to frictionally engage the walls of the bowl.

3. A strainer for tobacco pipes comprising a hollow body formed of wire cloth cupped to shape, with the free edges toward the bottom, and being open at its bottom and adapted to enter the bowl and when pressed to flatten and frictionally engage the walls of the bowl.

4. A strainer for tobacco pipes comprising a hollow body formed of wire cloth cupped to general bulbous form tapering toward its bottom with the free edges of the wire cloth toward the bottom, said body being arranged to be pressed into the bowl of the pipe and flattened to frictionally engage the walls thereof.

5. A strainer for tobacco pipes comprising a hollow body formed of wire gauze being closed at its top and open at its bottom and adapted to enter the bowl of the pipe and when pressed to somewhat flatten and engage the walls thereof.

In testimony whereof, I have hereunto set my hand.

LEE H. WESTCOTT.

Witnesses:
  F. W. Winter,
  Mary A. Cahoon.

---

Copies of this patent may be obtained for five cents each, by addressing the "Commissioner of Patents, Washington, D. C."